United States Patent [19]
Adamczyk

[11] Patent Number: 5,588,914
[45] Date of Patent: Dec. 31, 1996

[54] METHOD AND SYSTEM FOR GUIDING A USER IN A VIRTUAL REALITY PRESENTATION

[75] Inventor: John W. Adamczyk, Pasadena, Calif.

[73] Assignee: The Walt Disney Company, Burbank, Calif.

[21] Appl. No.: 267,184

[22] Filed: Jun. 28, 1994

[51] Int. Cl.$^6$ .................................................... G06F 3/00
[52] U.S. Cl. .............................. 463/32; 395/326; 395/119
[58] Field of Search .................... 395/119–127, 154–161; 345/8, 117–120; 463/6, 30–34

[56] References Cited

U.S. PATENT DOCUMENTS

| | | | |
|---|---|---|---|
| 4,580,782 | 4/1986 | Ochi | 463/32 |
| 4,600,200 | 7/1986 | Oka et al. | 463/32 |
| 5,269,687 | 12/1993 | Mott et al. | 463/6 X |
| 5,351,966 | 10/1994 | Tohyama et al. | 463/32 |
| 5,423,554 | 6/1995 | Davis | 463/32 |
| 5,522,018 | 5/1996 | Takeda et al. | 395/122 |
| 5,528,735 | 6/1996 | Strasnick et al. | 395/127 |

*Primary Examiner*—Raymond J. Bayerl
*Assistant Examiner*—John E. Breene
*Attorney, Agent, or Firm*—Fish & Neave; Jeffrey H. Ingerman

[57] ABSTRACT

A virtual reality system is provided in which a user can be guided within a virtual space to a specific destination within a specific time while providing the impression that the user is free to roam the virtual space at will. A leader object or "virtual guide" is projected ahead of the user and is constrained to move along a predetermined path. The user is allowed to move at will within a controlled distance of the leader object. That distance may change depending on the user's location and on elapsed time. Thus the user can be advanced through the virtual reality experience by advancing the leader object.

26 Claims, 5 Drawing Sheets

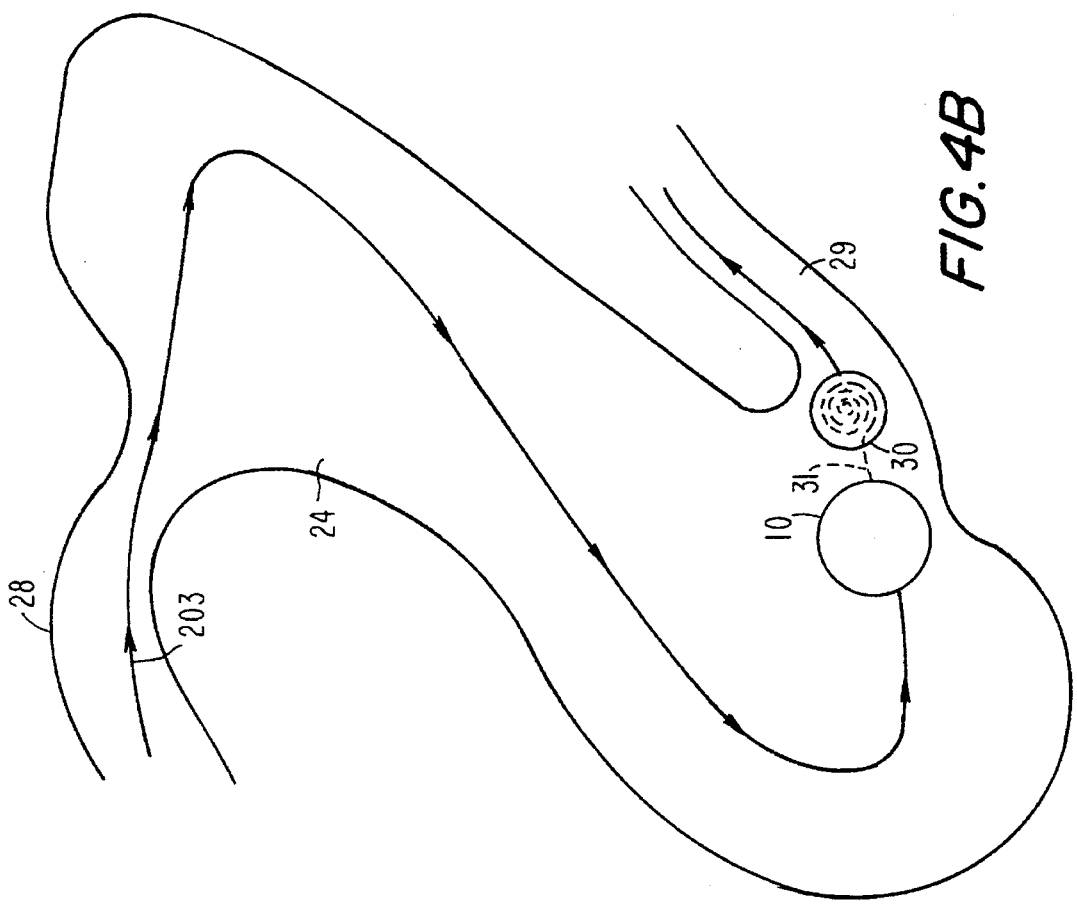
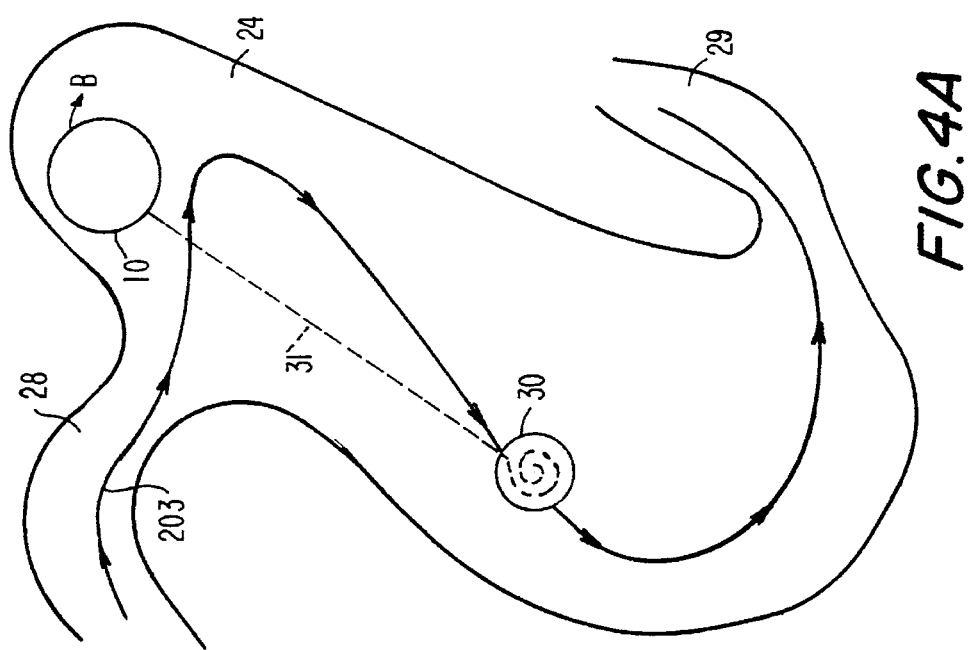

METHOD AND SYSTEM FOR GUIDING A USER IN A VIRTUAL REALITY PRESENTATION

BACKGROUND OF THE INVENTION

This invention relates to methods and systems for presenting virtual reality experiences to a user. More particularly, this invention relates to such systems where the user is guided through the experience because the outcome of the virtual reality experience is constrained.

In theory, a user presented with a virtual reality experience should be able to enter a virtual world or space and roam through that world or space at will, interacting as he or she desires with anything that may be found there, and spending as much time as desired without reaching any particular destination or objective. However, in certain practical virtual reality presentations, the experience may be constrained. For example, in an amusement-type virtual reality attraction, each user, or "guest," can only be given a limited time in the virtual world, so that other guests can have an opportunity to share the virtual experience.

In addition, the amount of computing power necessary to present a true, unconstrained virtual reality experience is very large, and very expensive. The cost of that amount of computing power would likely be prohibitive in the context of an amusement ride. Thus, it is necessary to limit the options given a guest in such an experience, while at the same time giving the guest the impression that he or she can move anywhere and do anything in the virtual space.

One way to give a guest such an impression is to present the guest with a fast-moving experience in which he or she is caught up and swept along. Such an experience would psychologically lead the guest in certain directions, minimizing the tendency of the guest to explore portions of the virtual space that have not been fully programmed. However, such a technique cannot be guaranteed to prevent the guest from going where he or she should not go. Moreover, it could not be assured that the guest would reach a desired objective within the time allotted.

It would be desirable to be able to provide a virtual reality system in which a user could be guided within a virtual space to a specific destination within a specific time while providing the impression that the user is free to roam the virtual space at will.

SUMMARY OF THE INVENTION

It is an object of this invention to provide a virtual reality system in which a user could be guided within a virtual space to a specific destination within a specific time while providing the impression that the user is free to roam the virtual space at will.

In accordance with this invention, there is provided a method of guiding a user through a virtual reality experience in a virtual world having at least one virtual space. The method includes projecting the virtual space in the field of view of the user, and defining at least one nominal path through the virtual space. An object is projected in the virtual space in the field of view of the user. The object is moved along the at least one nominal path, and is prevented from moving other than along the at least one nominal path. The user is allowed to move within the virtual space, but is restrained from exceeding a defined distance from the object.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 4A and 4B are schematic representations of how the leading object guides the user;

DETAILED DESCRIPTION OF THE INVENTION

Figure 1:
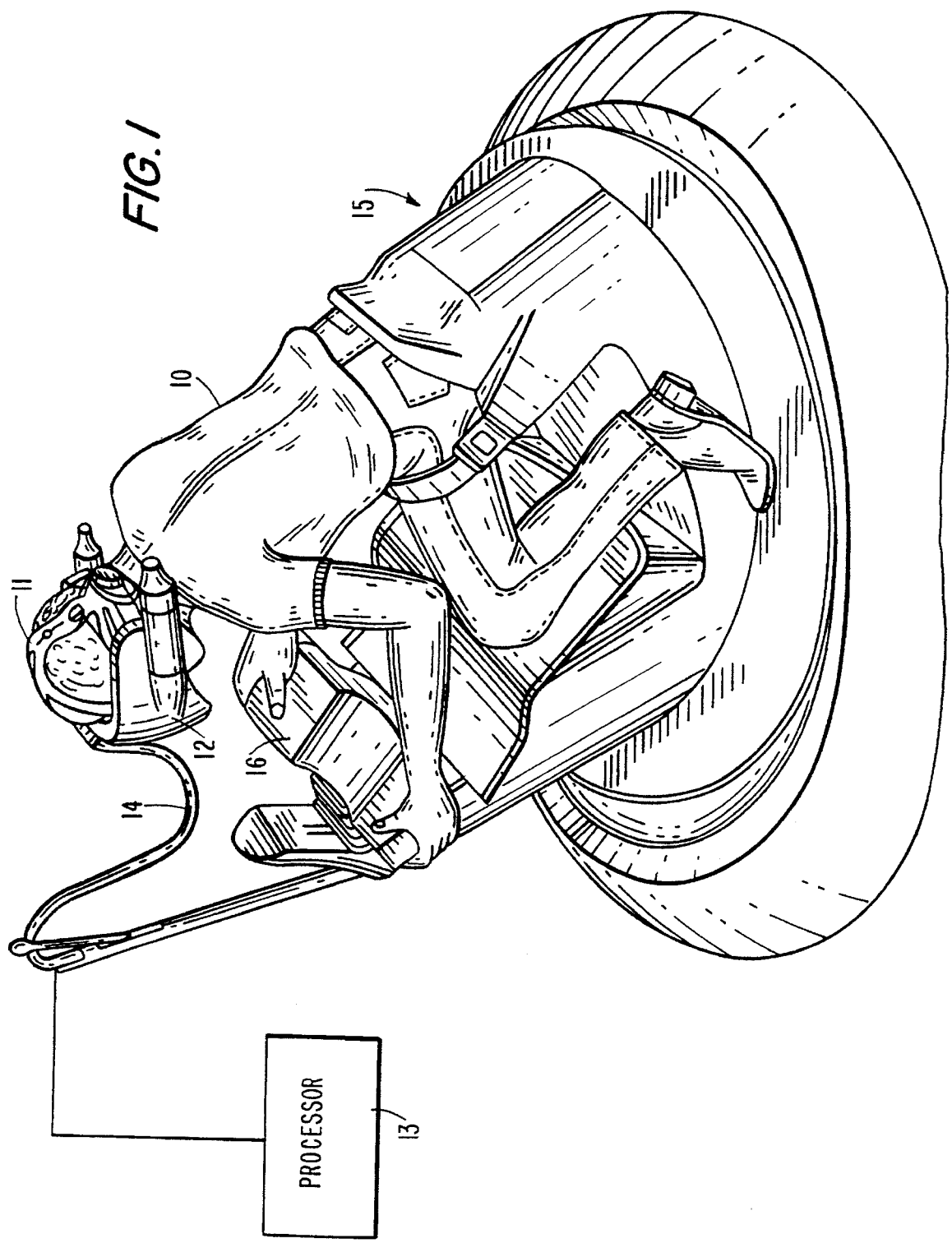
FIG. 1 is a perspective view of a user equipped to experience a virtual reality experience according to the present invention.

The present invention guides a user through a virtual reality experience toward a desired objective within an allotted time period by providing to the user a virtual guide to urge him or her through the virtual space. Thus, as suggested above, the guide might be a virtual character who runs or flies ahead of the user on a predetermined but invisible path or track and exhorts the user to follow. For example, the character may shout such phrases as "Hurry, we'll be late!" or "Come on, it's this way!" Alternatively, the guide may be an interesting non-living object capable of movement that entices the user. Either way however, as discussed above, such psychological tools may not be sufficient to keep the user on track and on schedule.

Therefore, in accordance with the present invention, the virtual guide is equipped with a "virtual tether" that is virtually connected between the guide and the user. Thus, as the guide moves along the path, the user is forced to come along. The length of the tether is also adjustable, so that the user can be given more or less leeway depending on the circumstances. When it is necessary, the tether can be shortened so that the user must be very close to the guide. On the other hand, at times it may be acceptable for the user to remain relatively far from the guide.

The virtual tether is implemented in the preferred embodiment of the invention by providing the ability to the virtual reality simulation program to control the speed at which it advances, in addition to providing such control to the user. When the user needs to be urged in a certain direction, or to change speed, the program control becomes more dominant.

The presence of the virtual tether may be masked from the user by presenting "explanations" in the virtual experience for the change in speed or direction. A simple "explanation" would be to have the guide speed up, while shouting at the user to hurry, and then using program control to increase the speed, hoping that the user attributes the increase to his or her own reaction to the guide. A more subtle "explanation" might be to have something happen in the virtual space that appears random but forces the user in the desired direction at the desired speed. For example, a strong gust of wind could come up and blow the user, or, if the virtual experience is at sea, a large wave could be substituted for the wind. Alternatively, a crowd could come along and the user could get caught up and shoved along.

The invention is illustrated in the FIGURES in the context of a particularly preferred embodiment of a virtual reality simulation in which the user believes that he or she is flying a magic carpet through a cave to reach a treasure. The cave has several chambers through which the user must fly, connected by narrow passageways or doorways. In accordance with the invention, the virtual tether is used to lead the user through the caves. The tether is shortened as the guide moves into and through doorways and passageways to (1) keep the user from losing sight of the guide as it moves to a new chamber, and (2) restrict the user's movements as he or she passes through narrow spaces. The tether can be made longer in the large chambers, giving the user the opportunity to explore. In general, the tether can also be made shorter to keep the user from approaching an area that may not be fully programmed.

There may be more than one permissible path to take through the virtual reality experience. In the preferred embodiment, there may be more than one acceptable path through the cave. Thus, the invention includes the ability to have the guide leave the predetermined nominal path for a different predetermined nominal path. Preferably, the guide will move to a new nominal path when the user, on the end of the tether, moves within a predetermined distance of the new path.

FIG. 1 shows a user 10 equipped to experience a virtual reality simulation in accordance with the present invention. The user preferably wears a helmet 11 including a head-mounted display 12 which fills the user's field of view with the substantially binocular output of processor 13, to which it is connected by cable 14. Head-mounted display 12 preferably also includes sensors (not shown) to determine the user's head movements, so that no matter where user 10 may turn his or her head, display 12 will project an image that realistically follows the user's head movements. User 10 is preferably sitting on a motion base 15 which moves to simulate the motion of, in the preferred embodiment, a magic carpet, in response to user manipulation of control device 16 which is disguised to feel, in the preferred embodiment, like the edge of a carpet.

Processor 13 may suitably be an ONYX Reality Engine 2 parallel computer from Silicon Graphics, Inc., of Mountain View, Calif., having eight parallel central processing units. A particularly preferred helmet 11 is described in copending, commonly-assigned U.S. patent application Ser. No. 08/267,183, filed concurrently herewith and hereby incorporated by reference in its entirety. A particularly preferred head-mounted display is described in copending, commonly-assigned U.S. patent application Ser. No. 08/267,187, U.S. Pat. No. 5,488,508, filed concurrently herewith and hereby incorporated by reference in its entirety. A particularly preferred motion base 15 is described in copending, commonly-assigned U.S. patent application Ser. No. 08/267,787, filed concurrently herewith and hereby incorporated by reference in its entirety. A particularly preferred control device 16 is described in copending, commonly-assigned U.S. patent application Ser. No. 08/267,429, now abandoned, filed concurrently herewith and hereby incorporated by reference in its entirety.

Figure 2:
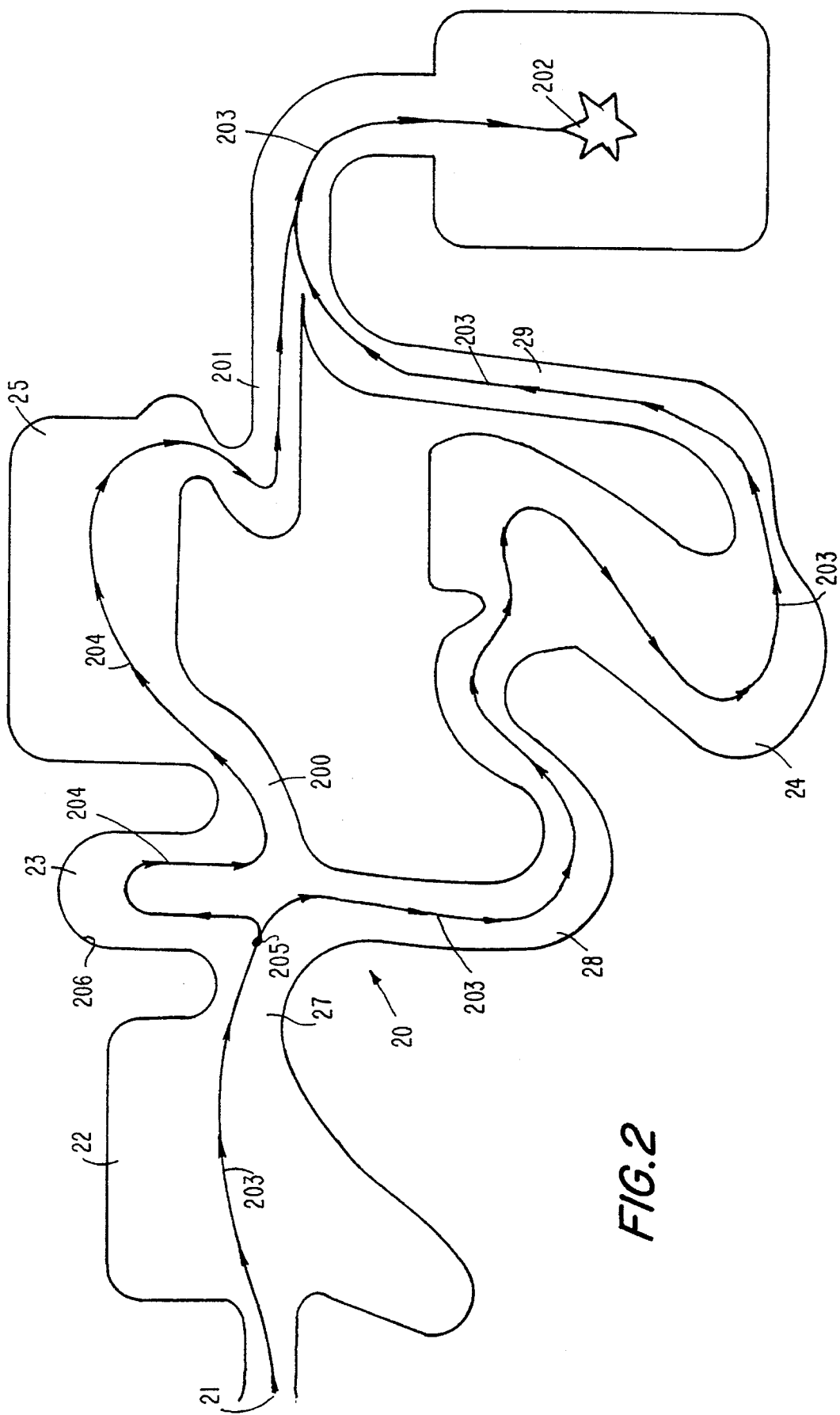
FIG. 2 is a schematic plan view of a virtual world which can be presented by the present invention.

The invention can be explained by reference to virtual world 20, shown schematically in FIG. 2. Virtual world 20 is a cave having a mouth 21 and a plurality of chambers 22, 23, 24, 25 and 26 interconnected by passageways 27, 28, 29, 200 and 201. The user's objective is to successfully navigate the cave, surviving various perils (not shown) to reach chamber 26 which contains a treasure indicated by starburst 202.

Figure 3:
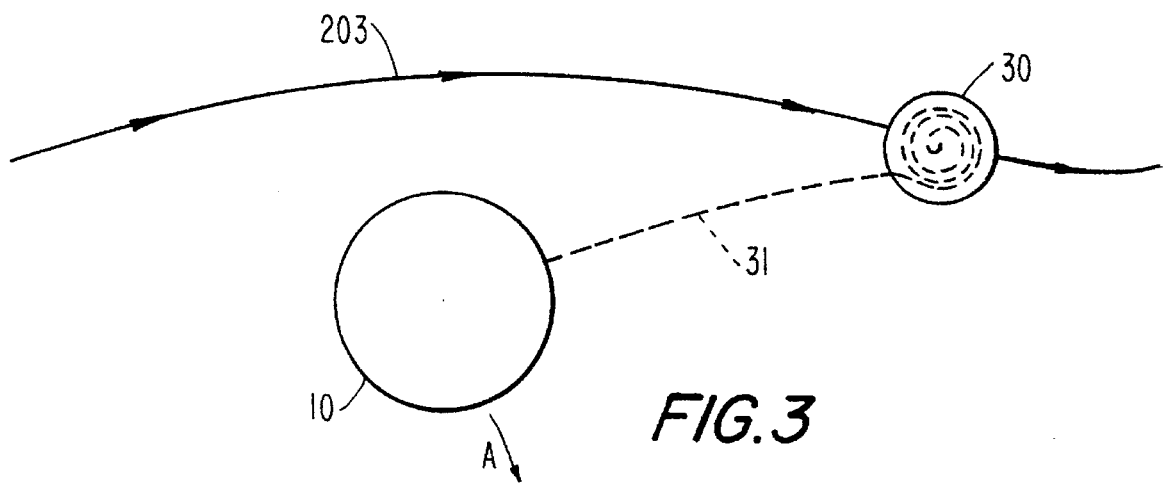
FIG. 3 is a schematic representation of a user virtually tethered to a leading object in accordance with the present invention.

Virtual world 20 is projected onto display 12 by processor 13, which also defines nominal path 203, and alternative nominal path 204, both of which lead to treasure 202, but through different chambers and passageways. Processor 13 also projects guide 30 (shown schematically in FIGS. 3–4B), which in the preferred embodiment may take the form of a talking bird, and virtually connects guide 30 to user 10 (shown schematically in FIGS. 3–4B) with virtual tether 31. As seen in FIG. 3, tether 31 is relatively long (although more tether is "reeled up" inside guide 30) and user 10 is moving in a direction, indicated by arrow A, that differs from the direction of motion of guide 30 along path 203. In FIGS. 4A and 4B, user 10 is passing through chamber 24. In FIG. 4A, user 10 is in the middle of chamber 24, and, given a long tether 31, is exploring back wall 40, and moving in the direction of arrow B. In FIG. 4B, guide 30 has advanced along path 203 to a point where it and user 10 must exit chamber 24 to enter passage 29. As can be seen, tether 31 has been shortened to a minimum length (a large amount of tether 31 can be seen "reeled up" inside guide 30), and user 10 is constrained to follow directly behind guide 30. In addition, as discussed above, tether 31 can be shortened, and guide 30 moved faster along path 203, when user 10 takes too long on his or her own to advance toward treasure 202 based on the time constraints of the virtual reality experience.

As discussed above, virtual world 20' includes an alternate path 204 leading user 10 through chamber 25 instead of chamber 24. Processor 13 may be programmed to select path 203 or 204 based on steering inputs by user 10 at or near point 205 (FIG. 2). Thus, if user 10 veers left to explore back wall 206 of chamber 23, he may end up on path 204. Alternatively, or additionally, processor 13 may be programmed to change from path 203 to path 204, or vice-versa, if user 10, tethered to guide 30 on one path or the other, moves to within a certain distance of the alternate path. Thus, user 10 might end up on path 203 after passing point 205, but may then decide to fly around chamber 23. If in doing so he comes close to path 204, processor 13 may move guide 30 onto path 204. The distance within which user 10 must approach an alternate path before guide 30 is switched to it may be constant, or may be variable. For example, to switch to path 204 near back wall 206, user 10 may have to actually cross path 204. But to switch to path 204 near passage 200, the user may not have to get as close to path 204; this allows processor 13 to switch user 10 to path 204 on sensing that he or she is flying toward passage 200 without waiting for him or her to actually reach the entrance to passage 200. Of course, user 10, once having switched paths, could switch back depending on the elapsed time or on the spatial constraints in chamber 23; in a bigger chamber, there would be fewer constraints.

Figure 5:
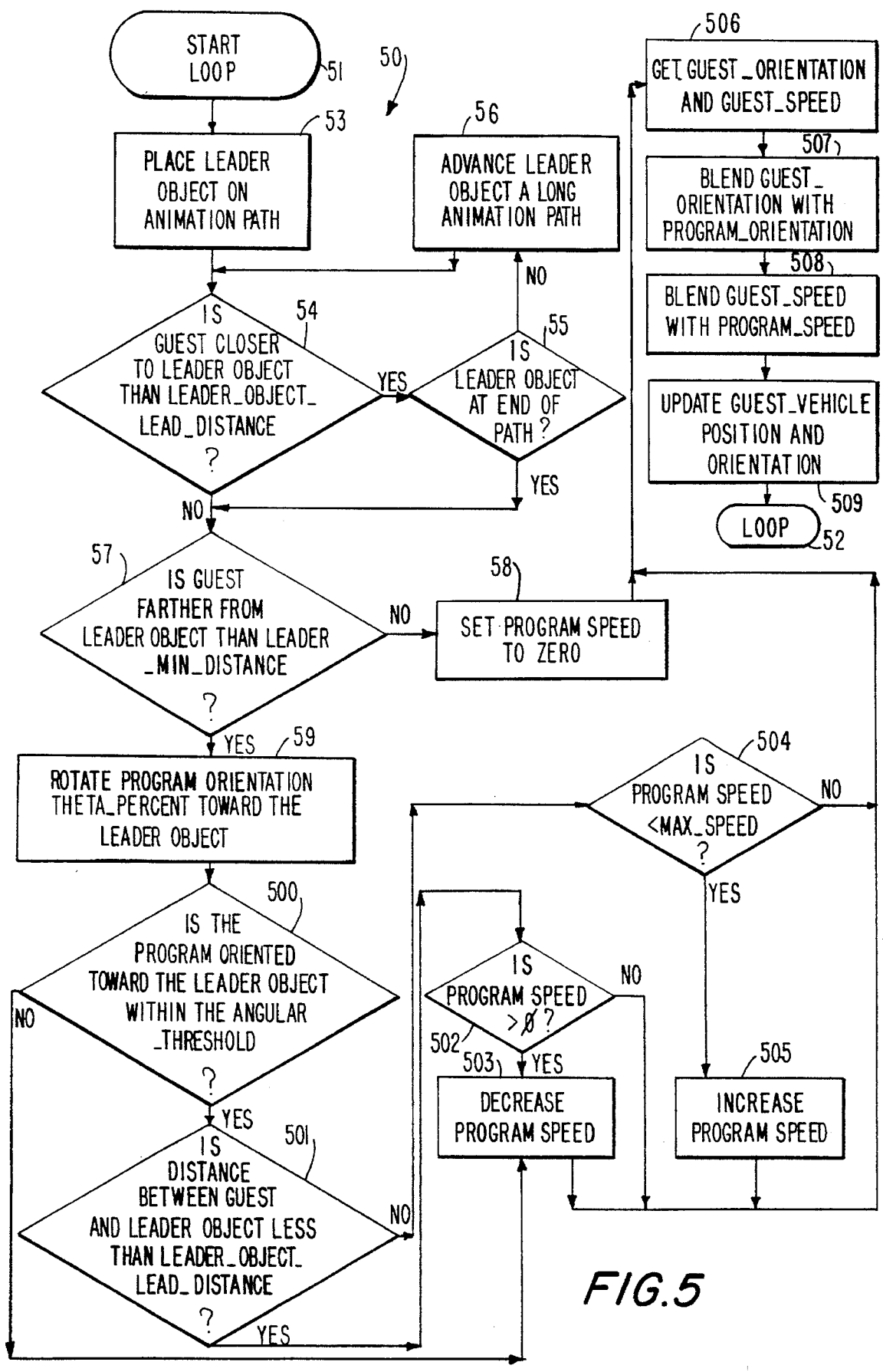
FIG. 5 is a flow diagram of a preferred embodiment of a computer program routine for implementing the leading object according to the invention.

FIG. 5 shows a flow diagram of a preferred embodiment of a software routine 50 for implementing the present invention. Routine 50 is preferably a loop, starting at 51 and ending at 52, within the larger virtual reality simulation program (not shown), which is executed substantially continually in processor 13 to update the user's speed and position.

At step 53, the leader object is placed on the selected animation path. Next at step 54, the system checks to see if the user is closer to the leader object than a preferred leading distance, LEADER_OBJECT_LEAD_DISTANCE. If so, then the user is too close to the leader object, and the system moves to test 55 to determine if the reason is that the leader object has reached the end of the path. If not, then at step 56 the leader object is moved further along the path to maintain the desired leading distance. Note that LEADER_OBJECT_LEAD_DISTANCE can be dynamically variable, changing as the user moves through different parts of the virtual space, as discussed above. Thus, LEADER OBJECT LEAD DISTANCE may represent the current length of virtual tether 31.

If the user is not closer to the leader object than LEADER_OBJECT_LEAD_DISTANCE (test 54), or is closer but the leader object has reached the end of the path (test 55), then the system moves to test 57 to determine whether or not the user is closer to the leader object than a minimum acceptable leading distance, LEADER_MIN_DISTANCE. If the user is at least as close to the leader object as LEADER_MIN_DISTANCE, then the user has effectively caught up to the leader object and the program controlled portion of the user's speed of progress through the virtual space is set to zero at step 58, and the program proceeds to step 506 (discussed below). Note that if test 57 is reached because of a negative result at test 54, then test 57 cannot yield a negative result. Thus step 58 will only be reached when test 57 is reached as a result of a positive result at test 55. In fact, in an alternative embodiment (not shown), a negative result at test 54 could lead directly to step 59 (discussed below), with test 57 only being reached from a positive result at test 55.

In either embodiment, if at test 57 the user is farther from the leader object than LEADER_MIN_DISTANCE, the system proceeds through a series of steps designed to make sure that the user follows, and stays within a predetermined distance from, the leader object. First, the system recognizes that the user may not even be facing the leader object and at step 59 the program portion of the orientation control is moved by a predetermined percentage, THETA_PERCENT, toward the leader object (rather than forcing the user suddenly to face the leader object). Next, at test 500 the system determines whether or not the user is facing within a predetermined angular threshold toward the leader object. If not, that means that the user is moving in a direction completely away from the leader object, and at step 503 the program speed is decreased to prevent the user from going too far in the wrong direction before his or her course can be corrected (thus reeling in the virtual tether), and the system proceeds to step 506 (discussed below).

If at test 500 the user is facing within the angular threshold toward the leader object, then the system proceeds to test 501 to determine whether or not the user is closer to the leader object than LEADER_OBJECT_LEAD_DISTANCE. If not, the user is not too close to the leader object and the system advances to test 504 to determine if the program control is already at maximum speed. If not, then at step 505 the program speed is increased and the system advances to step 506 (discussed below). If at test 504 the program is already at maximum speed, the system advances directly to step 506.

If at test 501 the user is closer to the leader object than LEADER_OBJECT_LEAD_DISTANCE, then the user is too close and must be slowed down, and the system advances to test 502 to see if the program control is already at zero speed. If program speed is still greater than zero, then at step 503 program speed is decreased and the system advances to step 506. If at test 502 program speed is found to be zero already, then the system advances directly to step 506.

Figure 6:
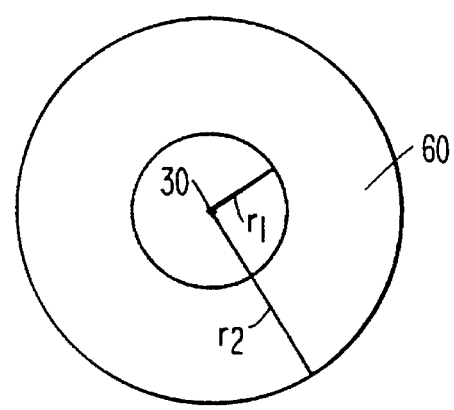
FIG. 6 is a schematic diagram useful in understanding the operation of the computer program routine of FIG. 5.

The steps recited up to this point are carried out to keep the user's speed and distance from the leader object under control to substantially the maximum extent possible using only program controls. By speeding up and slowing down the program, the user can be kept further from leader object 30 than a minimum radius $r_1$ (see FIG. 6) corresponding to LEADER_MIN_DISTANCE, but not farther from leader object 30 than a maximum radius $r_2$ corresponding to LEADER_OBJECT_LEAD_DISTANCE, thereby keeping user 10 within zone 60 relative to leader object 30. Of course, as discussed above, the variables representing radii $r_1$ and $r_2$ can be dynamically variable, changing as user 10 moves through the virtual space to take into account the characteristics (e.g., narrow or wide open) of the current location, or to take into account elapsed time (e.g., after a certain elapsed time user 10 may be given less freedom of movement if he or she has proceeded too slowly, so that the leader object can advance user 10 to the objective within the allotted time).

Having adjusted the program control as much as possible at 58, 502, 503, 504 or 505, the system at step 506 determines what speed and directional commands user 10 is inputting at control device 16. At steps 507 and 508, the user inputs are blended with the program inputs and used to update the position and orientation of user 10 at step 509 before the loop ends at 52.

The loop 50 preferably is continually repeated to update user position and orientation. The relative weights given to user inputs and program inputs in steps 507–509 preferably change dynamically depending on the location of user 10 in the virtual space, and on elapsed time, or on other factors, thereby implementing the virtual tether as described above. As shown in FIG. 5, the update of user position in step 509 is actually described as an update of the position and orientation of the user's vehicle (e.g., magic carpet). This is because user 10 is allowed to turn his or her head to any orientation; in the preferred embodiment, the program can only control the vehicle (on the other hand, user and vehicle position, as opposed to orientation, are virtually identical, at least for purposes of the preferred embodiment).

Thus it is seen that a virtual reality system is provided in which a user can be guided within a virtual space to a specific destination within a specific time while providing the impression that the user is free to roam the virtual space at will. One skilled in the art will appreciate that the present invention can be practiced by other than the described embodiments, which are presented for purposes of illustration and not of limitation, and the present invention is limited only by the claims that follow.

What is claimed is:

1. A method of guiding a user through a virtual reality experience in a virtual world having at least one virtual space, said user having a field of view, said method comprising:

projecting said virtual space in the field of view of said user;

defining at least one nominal path through said virtual space;

projecting an object in said virtual space in the field of view of said user;

moving said object along said at least one nominal path;

preventing said object from moving other than along said at least one nominal path;

allowing said user to move within said virtual space; and restraining said user from exceeding a defined distance from said object.

2. The method of claim 1 further comprising dynamically changing said defined distance as said user moves in said virtual space, for advancing said virtual reality experience.

3. The method of claim 2 wherein:

said virtual world has a plurality of said virtual spaces, each of said virtual spaces being connected to an adjacent one of said virtual spaces by a respective passageway;

said object moves between said virtual spaces through said passageway to advance said virtual reality experience; and said step of dynamically changing said defined distance comprises decreasing said defined distance when said object moves through said passageway.

4. The method of claim 1 wherein said step of moving said object along said at least one nominal path comprises moving said object in accordance with at least one of (a) temporal constraints of said virtual reality experience, and (b) spatial constraints of said virtual reality experience.

5. The method of claim 1 wherein:

said step of defining at least one nominal path comprises defining a plurality of nominal paths; and said preventing step comprises preventing said object from moving other than along one of said nominal paths; said method further comprising:

switching said object from one of said nominal paths to another of said nominal paths when said user, moving within said virtual space with said object on said one of said nominal paths, enters a predefined zone associated with said another of said nominal paths.

6. The method of claim 5 wherein said predefined zone is a zone of constant distance from said another of said nominal paths.

7. The method of claim 5 wherein said predefined zone is a zone of variable distance from said another of said nominal paths, said variable distance being selected to advance said virtual reality experience.

8. The method of claim 1 wherein said step of moving said object along said at least one nominal path comprises moving said object when said user is within a predetermined distance from said object.

9. The method of claim 8 wherein said predetermined distance is constant.

10. The method of claim 8 wherein said predetermined distance varies along said nominal path in accordance with constraints of said virtual reality experience.

11. The method of claim 8 further comprising urging the user toward said object when the user is beyond said predetermined distance from said object and at least one of (a) temporal constraints of said virtual reality experience, and (b) spatial constraints of said virtual reality experience, require that said object be moved along said at least one nominal path.

12. The method of claim 1 wherein said restraining step comprises increasing velocity of travel by said user toward said object when said user exceeds a predetermined maximum distance from said object.

13. The method of claim 1 wherein said step of moving said object along said at least one nominal path comprises moving said object when said user is within a predetermined area of said virtual space.

14. A system for guiding a user through a virtual reality experience in a virtual world having at least one virtual space, said user having a field of view, said system comprising:

a virtual space projector for projecting said virtual space in the field of view of said user;

a nominal path definer for defining at least one nominal path through said virtual space;

a virtual object projector for projecting an object in said virtual space in the field of view of said user;

a virtual object mover for moving said object along said at least one nominal path;

a virtual object constrainer for preventing said object from moving other than along said at least one nominal path;

a user input for allowing said user to move within said virtual space; and a user restraint for restraining said user from exceeding a defined distance from said object.

15. The system of claim 14 further comprising a dynamic defined distance changer for dynamically changing said defined distance as said user moves in said virtual space, for advancing said virtual reality experience.

16. The system of claim 15 wherein:

said virtual world has a plurality of said virtual spaces, each of said virtual spaces being connected to an adjacent one of said virtual spaces by a respective passageway;

said virtual object mover moves said object between said virtual spaces through said passageway to advance said virtual reality experience; and said dynamic distance changer decreases said defined distance when said object moves through said passageway.

17. The system of claim 14 wherein said virtual object mover moves said object along said at least one nominal path in accordance with at least one of (a) temporal constraints of said virtual reality experience, and (b) spatial constraints of said virtual reality experience.

18. The system of claim 14 wherein:

said nominal path definer defines a plurality of nominal paths; and said virtual object constrainer prevents said object from moving other than along one of said nominal paths; said system further comprising:

a virtual object switcher for switching said object from one of said nominal paths to another of said nominal paths when said user, moving within said virtual space with said object on said one of said nominal paths, enters a predefined zone associated with said another of said nominal paths.

19. The system of claim 18 wherein said predefined zone is a zone of constant distance from said another of said nominal paths.

20. The system of claim 18 wherein said predefined zone is a zone of variable distance from said another of said nominal paths, said variable distance being selected to advance said virtual reality experience.

21. The system of claim 14 wherein said virtual object mover moves said object along said at least one nominal path when said user is within a predetermined distance from said object.

22. The system of claim 21 wherein said predetermined distance is constant.

23. The system of claim 21 wherein said predetermined distance varies along said nominal path in accordance with constraints of said virtual reality experience.

24. The system of claim 21 further comprising a user input override for urging the user toward said object when the user is beyond said predetermined distance from said object and at least one of (a) temporal constraints of said virtual reality experience, and (b) spatial constraints of said virtual reality experience, require that said object be moved along said at least one nominal path.

25. The system of claim 14 wherein said user restraint increases velocity of travel by said user toward said object when said user exceeds a predetermined maximum distance from said object.

26. The system of claim 14 wherein said virtual object mover moves said object when said user is within a predetermined area of said virtual space.

* * * * *